US006528440B1

(12) United States Patent
Vilato et al.

(10) Patent No.: US 6,528,440 B1
(45) Date of Patent: Mar. 4, 2003

(54) GLASS-CERAMIC PLATE AND METHOD FOR MAKING SAME

(75) Inventors: Pablo Vilato, Paris (FR); Catherine Bourrat, Crezancy (FR); Gilles Grandpierre, Essomes sur Marne (FR); Sophie Peschiera, Champagne sur Seine (FR)

(73) Assignee: Eurokera, Chateau-Therry (FR)

( * ) Notice: Subject to any disclaimer, the term of this patent is extended or adjusted under 35 U.S.C. 154(b) by 0 days.

(21) Appl. No.: 09/269,209

(22) Filed: Nov. 19, 1999

(30) Foreign Application Priority Data

Aug. 1, 1997 (FR) ............................................. 97 09912

(51) Int. Cl.⁷ ............................................... C03C 10/12
(52) U.S. Cl. .................. 501/7; 501/4; 65/33.8
(58) Field of Search ........................ 501/4, 7; 65/33.8

(56) References Cited

U.S. PATENT DOCUMENTS

| | | | | |
|---|---|---|---|---|
| 4,057,494 A | * | 11/1977 | Rittler | 501/7 |
| 4,192,665 A | * | 3/1980 | Chyung et al. | 501/7 |
| 4,212,678 A | * | 7/1980 | Chyung et al. | 501/7 |
| 4,285,728 A | * | 8/1981 | Babcock et al. | 501/7 |
| 4,461,839 A | * | 7/1984 | Rittler | 501/7 |
| 4,835,121 A | * | 5/1989 | Shibuya et al. | 501/7 |
| 5,070,045 A | * | 12/1991 | Comte et al. | 501/4 |
| 5,173,453 A | * | 12/1992 | Beall et al. | 501/4 |
| 5,212,122 A | * | 5/1993 | Panhorst et al. | 501/69 |
| 5,422,318 A | * | 6/1995 | Hagg et al. | 501/4 |
| 5,492,869 A | * | 2/1996 | Beall et al. | 501/7 |
| 5,512,520 A | * | 4/1996 | Pfitzenmaier | 501/7 |
| 5,895,767 A | * | 4/1999 | Yamaguchi et al. | 501/7 |

FOREIGN PATENT DOCUMENTS

EP 0437228 * 7/1991

* cited by examiner

Primary Examiner—Karl Group
(74) Attorney, Agent, or Firm—Oblon, Spivak, McClelland, Maier & Neustadt, P.C.

(57) ABSTRACT

A glass-ceramic plate based on silicon, aluminum and lithium oxides is intended, in particular, to cover heating elements. The plate has a diffuse transmission factor of at least 50%. A process for manufacturing the plate is provided.

15 Claims, No Drawings

GLASS-CERAMIC PLATE AND METHOD FOR MAKING SAME

This application is the U.S. national stage of International Application No. PCT/FR98/01676 filed Jul. 29, 1998.

The present invention relates to a glass-ceramic plate, intended in particular to cover heating elements.

More particularly, the invention is directed toward a glass-ceramic plate used as a cooking top. Such a cooking top is provided in particular with underlying heating elements such as heat sources of halogen-lamp or radiant type.

To be usable as a cooking top with underlying heating elements, a glass-ceramic plate must meet a certain number of criteria:

- on the one hand its transmission of wavelengths in the visible region must be sufficiently low to mask at least part of the underlying heating element(s) to ensure that the user is not dazzled by such underlying heating element(s) when in operating condition and, from the viewpoint of safety, must also be sufficiently high that the user can visually recognize that the heating element(s) is or are in operating condition;
- on the other hand, in order to optimize heating and cooking efficiency, its transmission of wavelengths in the infrared region must be high.

On the present market for glass ceramics there exist two types of plates which can be differentiated by their appearance: one plate of transparent brown appearance and one plate of opaque white appearance.

The first type mentioned hereinabove is used when the associated underlying elements are heating elements such as heating sources of the halogen-lamp or radiant type. The second type mentioned hereinabove is associated exclusively with induction-heating means.

The present market demand is oriented toward new appearances of glass-ceramic plates, particularly toward appearances in harmony with the kitchen furniture.

The invention attempts to respond to current market demand and to propose a new type of glass-ceramic plate whose appearance and optical characteristics are still compatible with a use of underlying heating elements such as elements of the radiant or halogen-lamp type.

Consequently, the object of the invention is a glass-ceramic plate based on silicon, aluminum and lithium oxides, intended in particular to cover heating elements. According to the invention, said plate has a diffuse transmission factor of at least 50%. It is pointed out that the diffuse transmission factor is a measure of light diffusion and, in the scope of the invention, is defined as the ratio of diffuse transmission to total transmission at a wavelength of 550 nm.

The diffuse transmission factor is preferably greater than 70% and advantageously greater than 90%.

According to an advantageous characteristic, the plate according to the invention exhibits light transmission $T_L$ of between 5 and 40%, especially of between 5 and 10%, preferably of between 6 and 9%.

The glass-ceramic plate proposed in this form by the invention overcomes the cited technical problem.

According to another characteristic, the plate according to the invention has as its preferably single crystalline phase a solid solution of β-spodumene crystals, in which the size of the individual crystallites is advantageously smaller than 100 nm.

Advantageously, the plate according to the invention has a coefficient of linear expansion smaller than $15 \times 10^{-7}/°$ C., especially equal to $9 \times 10^{-7}/°$ C. in the temperature range of between 20° C. and 700° C.

The plate defined hereinabove is also remarkable in that it is composed substantially of the following oxides, expressed in wt %:

| | |
|---|---|
| SiO$_2$ | 63–70 |
| Al$_2$O$_3$ | 18–22 |
| Li$_2$O | 2.5–4.5 |

The invention is also directed toward a process for manufacture of a glass-ceramic plate based on silicon, aluminum and lithium oxides, intended in particular to cover heating elements, in which process there is performed at least one cycle of ceramization of a glass plate, the said ceramization cycle including a crystallization plateau corresponding to a duration t at a temperature T for formation of the β-quartz crystalline phase.

According to the process of the invention, there is performed a heat-treatment cycle in which the duration t' is longer and/or the temperature T' is higher by at least 5% compared with the duration t and/or temperature T respectively.

According to a first variant of the invention, the difference T'–T is at least 40° C., preferably 100° C.

According to a second variant of the invention, the difference t'–t is at least 15 minutes.

Finally, the invention relates to a glass composition used for operation of the process cited hereinabove, which composition is remarkable in that it comprises the following oxides, expressed in wt %:

| | |
|---|---|
| SiO$_2$ | 63–70 |
| Al$_2$O$_3$ | 18–22 |
| Li$_2$O | 2.5–4.5 |

Within the scope of the invention, when such a glass composition is used, the resulting plate has a substantially "milky" appearance. obviously all kinds of coloring oxides can be added to the glass composition without modifying the desired effect, which is a diffusing appearance.

In fact, the authors of the present invention have found unexpectedly that this diffusing appearance of the glass-ceramic plate is due to the presence of β-spodumene crystals as the single crystalline phase.

Heretofore the person skilled in the art would have assumed that such a phase would necessarily impart an opaque appearance to a glass-ceramic plate.

The glass-ceramic plate proposed by the invention can be used in a device for cooking and/or holding at high temperature other than that targeted in particular by the invention, such other device being provided with heating means other than heating elements of the radiant or halogen-lamp type, examples being induction and/or gas heating means.

Of course, the glass-ceramic plate according to the invention can also be used in a hybrid cooking device, or in other words one comprising at least two different heat sources of direct and indirect heat-transfer type, for example at least one heating element such as a radiant heater, a halogen lamp and at least one atmospheric gas burner and/or at least one induction-heating means.

In this variant, the plate is then provided with at least one zone intended to cover the heating element and at least one opening intended to accommodate the atmospheric gas burner and/or at least one zone intended to cover the induction-heating means.

It can be provided that this opening be shaped and that it be disposed at the top of a local deformation of the plate such as described in French Patent Application 97-061114 filed on May 20, 1997.

Other advantageous details and characteristics will become clear hereinafter from the description of non-limitative practical examples of a glass-ceramic plate according to the invention.

It is pointed out first of all that the glass-ceramic plates according to the invention and corresponding to Examples 1 to 5 all have the same composition.

This comprises the following oxides, expressed in wt %:

| | |
|---|---|
| $SiO_2$ | 69.05 |
| $Al_2O_3$ | 18.90 |
| $Li_2O$ | 3.3 |
| MgO | 0.9 |
| ZnO | 1.55 |
| BaO | 0.75 |
| $K_2O$ | 0.1 |
| $TiO_2$ | 2.6 |
| $ZrO_2$ | 1.75 |
| $As_2O_3$ | 0.9 |
| $Na_2O$ | 0.2 |

Glasses having the composition mentioned hereinabove are melted at around 1650° C. in such a quantity that there can be rolled a continuous glass sheet from which there are cut glass plates having final dimensions of 56.5 cm×56.5 cm×0.4 cm.

These glass plates are usually ceramized in a manner known in itself on ceramic screens in a ceramization cycle. This ceramization cycle comprises in known manner the following stages:
- a) elevation of the temperature at 50 to 80 degrees per minute up to the nucleation region, which is generally close to the glass transition region;
- b) passage through the nucleation interval (670 to 800° C.) in about twenty minutes;
- c) elevation of the temperature in 15 to 30 minutes to the temperature T of the ceramization plateau, which lies between 900 and 960° C.;
- d) holding the temperature T of the ceramization plateau for a time t of 10 to 25 minutes;
- e) rapid cooling to room temperature.

It is pointed out that, within the scope of the invention, a cycle of ceramization of a glass plate based on $SiO_2$—$Al_2O_3$—$Li_2O$ is a heat-treatment cycle which includes a plateau, at the end of which the glass plate based on $SiO_2$—$Al_2O_3$—$Li_2O$ contains the β-quartz crystalline phase.

To make glass-ceramic plates according to the invention and with reference to Examples 1 to 5, the following procedure is applied:

EXAMPLE 1

A heat-treatment cycle is achieved by performing:
- one time, in strictly identical manner, stages a), b), c), d), e) of the ceramization cycle described hereinabove;
- one time, in strictly identical manner, stages a), b), d), e) of the ceramization cycle described hereinabove;
- prior to stages d) and e), a stage c') in which the temperature is raised in 15 to 30 minutes to a temperature T' on the order of 1050° C.

EXAMPLES 2, 3 AND 4

For each of these examples, a heat-treatment cycle is achieved by performing:
one time, in strictly identical manner, stages a), b) and e) of the ceramization cycle described hereinabove; and, prior to stage e):
- a stage c') in which the temperature is raised in 15 to 30 minutes to the temperature T' on the order of 1050, 1060, 1070° C. respectively;
- a stage d') in which the temperature T' is held for a time t' at least 15 minutes longer than time t.

EXAMPLE 5

A heat-treatment cycle is achieved by performing nine times, in strictly identical manner, stages a), b), c), d) and e) of the ceramization cycle described hereinabove.

EXAMPLES 6 AND 7

Comparative Examples 6 and 7 relate to glass-ceramic plates according to the prior art, which are produced under industrial conditions and sold respectively by the EUROKERA Co. and by the NIPPON ELECTRIC GLASS Co. (NEG) and which are respectively of transparent brown and opaque white appearance.

The glass-ceramic plates corresponding to Examples 1 to 5 all have a "milky" white appearance.

Each of the glass-ceramic plates corresponding to Examples 3 to 5 was subjected to different measurements and tests for crystallographic, thermal and mechanical characterization:

1/ first of all an X-ray diffraction analysis was performed. It was found that all plates contained as the single crystalline phase a solid solution of β-spodumene crystals.

The size of the individual crystallites of these crystals was measured by means of this technique and is presented in Table 1 hereinafter;

2/ thermal shock tests were performed by subjecting the plates to a temperature difference on the order of 700° C. No break occurred. The thermal expansion was measured between room temperature and 700° C. by means of a differential thermal expansion gauge.

3/ the deformation during laboratory tests was measured. After completion of the heat-treatment cycle, the plate was cut to dimensions of 35 cm×50 cm and placed on a mechanical test support of marble type. The deformation is the maximum value of the difference between the readings of two points on the diagonal, a difference measured by means of a mechanical device of the feeler type. We consider a deformation of smaller than 0.6 mm measured under laboratory conditions to be acceptable for the manufacture of plates under industrial conditions.

The modulus of rupture (MR) was then measured. The plates were first polished and then abraded with an abrasive of controlled particle size distribution. They were then placed on a three-ball support and subjected to an axial load until fracture occurred.

The results of the measurements and tests performed are collected in Table 1 hereinbelow.

TABLE 1

|  | Crystallite size (nm) | Coefficient of thermal expansion (× $10^{-7}$/° C.) | MR (MPa) | Deformation (mm) |
|---|---|---|---|---|
| Example 1 | 70 | 9.6 | 110 | 0.1 |
| Example 2 | 80 | 9.5 | 109 | 0.13 |
| Example 3 | 80 | 9.5 | 106 | 0.15 |
| Example 4 | 80 | 9.5 | 106 | 0.19 |
| Example 5 | 80 | 9.2 | 137 | 0.2 |

Finally the spectrophotometric values of glass-ceramic plates corresponding to Examples 1 to 5 according to the invention and of those corresponding to Comparative Examples 6 and 7 were measured.

It is pointed out that the measurements of the plates corresponding to Examples 1 to 5 were made on smooth faces which were parallel to each other.

It is also pointed out that the measurements of light transmission $T_L$ in the visible wavelength region (integrated between 0.38 μm and 0.78 μm) and of the diffuse transmission factor H (which, it is recalled is equal here to the ratio of diffuse transmission to total transmission at a wavelength of 550 nm) were performed under $D_{65}$ illumination.

Finally it is pointed out that the measurements of infrared transmission $T_{IR}$ (integrated between 0.78 μm and 2.15 μm) were performed in accordance with ISO standard 9050.

The values integrated over a thickness of 4 mm are indicated as percentages in Table 2 hereinbelow.

TABLE 2

|  | $T_L$ | H | $T_{IR}$ |
|---|---|---|---|
| Example 1 | 6.43 | 100 | 44.84 |
| Example 2 | 8.67 | 100 | 44.39 |
| Example 3 | 8.01 | 100 | 42.20 |
| Example 4 | 6.04 | 100 | 37.50 |
| Example 5 | 30.92 | 76 | 79.85 |
| Example 6 | 1.45 | 48 | 56.66 |
| Example 7 | 0.31 | * | 14.93 |

*It was not possible to determine the value of the diffuse transmission factor. This is due to the fact that a phenomenon of refraction and not light diffusion occurred.

From Table 2 hereinabove it is clearly evident that the plates according to the invention are visually very readily distinguishable from the prior art plates, with a substantial increase in light transmission $T_L$ and of diffuse transmission factor H, and that they exhibit infrared transmission which is entirely compatible with the use of underlying heating elements.

This compatibility has also been corroborated by tests on boiling time. In these tests, a casserole dish is filled with one liter of water at a temperature of 15±2° C. and then placed on the glass-ceramic plate, underneath which a heating element of the radiant or halogen-lamp type is operating, and finally the time required for the water to be heated from 20° C. to a temperature of 98° C. is recorded. The time recorded for all glass-ceramic plates corresponding to Examples 1 to 5 is substantially identical to that recorded for Comparative Examples 6 and 7.

Obviously numerous modifications can be made to the glass-ceramic plate and to the manufacturing process described hereinabove without going beyond the scope of the invention. Thus it is possible cumulatively or alternatively to increase the level of light diffusion obtained in the glass-ceramic plate according to the process described hereinabove by some other means, for example by modification of the surface texture of at least one of the two faces of the plate.

What is claimed is:

1. A glass-ceramic plate suitable for covering heating elements, the glass-ceramic plate comprising silicon, aluminum and lithium oxides, wherein the glass-ceramic plate has as its single crystalline phase a solid solution of β-spodumene crystals;

the glass-ceramic plate has a light transmission, $T_L$, of between 5 and 40%; and the glass-ceramic plate has a diffuse transmission factor of at least 50%.

2. The glass-ceramic plate of claim 1, wherein the plate has a diffuse transmission factor greater than 70%.

3. The glass-ceramic plate of claim 1, wherein the plate has a diffuse transmission factor greater than 90%.

4. The glass-ceramic plate of claim 1, wherein the plate has a light transmission, TL, of between 5 and 10%.

5. The glass-ceramic plate of claim 1, wherein the plate has a light transmission, TL, of between 6 and 9%.

6. The glass-ceramic plate of claim 1, wherein the size of the individual crystallites of the β-spodumene crystals is smaller than 100 nm.

7. The glass-ceramic plate of claim 1, wherein the plate has a coefficient of thermal expansion smaller than $15 \times 10^{-7}$/° C. in the temperature range of from 20° C. to 700° C.

8. The glass-ceramic plate of claim 1, wherein the plate has a coefficient of thermal expansion equal to $9 \times 10^{-7}$/° C. in the temperature range of from 20° C. to 700° C.

9. The glass-ceramic plate of claim 1, wherein the plate comprises

63–70 wt % $SiO_2$,

18–22 wt % $Al_2O_3$, and 2.5–4.5 wt % $Li_2O$.

10. A process for manufacturing a glass ceramic plate, the process comprising providing a glass plate based on silicon, aluminum and lithium oxides;

performing on the glass plate a heat treatment cycle; and producing the glass-ceramic plate of claim 1.

11. The process according to claim 10, wherein the duration, t', of the heat treatment cycle is longer by at least 5% than a duration, t, of from 10 to 25 minutes of a ceramization plateau in a ceramization cycle for formation of a β-quartz crystalline phase, and/or the maximum temperature, T', of the heat treatment cycle is higher by at least 5% than a temperature, T, of between 900° C. and 960° C. of the ceramization plateau in a ceramization cycle for formation of a β-quartz crystalline phase.

12. The process of claim 11, wherein the difference T'–T is at least 40° C.

13. The process of claim 11, wherein the difference T'–T is at least 100° C.

14. The process of claim 1, wherein the difference t'–t is at least 15 minutes.

15. A device for cooking and/or holding at high temperature, the device comprising the glass-ceramic plate of claim 1, and one or more heating elements selected from the group consisting of radiant heating elements, halogen-lamp elements atmospheric gas burners, and induction-heating means.

* * * * *